US012318915B2

(12) United States Patent
Wise et al.

(10) Patent No.: US 12,318,915 B2
(45) Date of Patent: Jun. 3, 2025

(54) VISUAL GUIDANCE FOR LOCATING OBSTRUCTED MOBILE ROBOTS

(71) Applicant: ZEBRA TECHNOLOGIES CORPORATION, Lincolnshire, IL (US)

(72) Inventors: Melonee Wise, San Jose, CA (US); Peter Arandorenko, Mississauga (CA); Benjamin Narin, Lincolnshire, IL (US); Achal Arvind, Santa Clara, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 406 days.

(21) Appl. No.: 17/976,410

(22) Filed: Oct. 28, 2022

(65) Prior Publication Data

US 2024/0139968 A1 May 2, 2024

(51) Int. Cl.
*B25J 13/08* (2006.01)
*B25J 9/16* (2006.01)
*B25J 13/00* (2006.01)

(52) U.S. Cl.
CPC .......... *B25J 13/089* (2013.01); *B25J 13/006* (2013.01); *B25J 9/1676* (2013.01)

(58) Field of Classification Search
CPC . B25J 9/00; B25J 9/1676; B25J 13/006; B25J 13/089
USPC .......................................................... 700/245
See application file for complete search history.

(56) References Cited

U.S. PATENT DOCUMENTS

| | | | |
|---|---|---|---|
| 9,964,765 B2* | 5/2018 | Gardiner | G02B 27/017 |
| 12,014,622 B2* | 6/2024 | Goossens | G05D 1/0287 |
| 2021/0178576 A1* | 6/2021 | Murphy | B25J 19/023 |
| 2022/0397912 A1* | 12/2022 | Franey | B65G 1/1373 |
| 2023/0260378 A1* | 8/2023 | Goossens | B60Q 9/00 |
| | | | 340/326 |

FOREIGN PATENT DOCUMENTS

| | | | | |
|---|---|---|---|---|
| WO | WO-2019173396 A1 * | 9/2019 | | B25J 13/00 |
| WO | WO-2020006146 A1 * | 1/2020 | | B25J 13/06 |
| WO | WO-2022192585 A1 * | 9/2022 | | A61B 34/10 |

* cited by examiner

*Primary Examiner* — Ronald D Hartman, Jr.

(57) ABSTRACT

A method includes: obtaining a pose of a mobile computing device associated with a worker in a facility; detecting a trigger event to initiate presentation, at the mobile computing device, of visual guidance corresponding to one of a plurality of mobile robots in the facility; in response to detecting the trigger event, selecting one of the mobile robots; determining, based on the pose of the mobile computing device and a map of the facility, whether the selected one of the mobile robots is visually obstructed from the pose of the mobile computing device; and when the selected one of the mobile robots is visually obstructed, providing visual guidance via the mobile computing device, the visual guidance indicating a current location of the selected mobile robot behind an obstruction.

20 Claims, 10 Drawing Sheets

VISUAL GUIDANCE FOR LOCATING OBSTRUCTED MOBILE ROBOTS

BACKGROUND

Autonomous or semi-autonomous mobile robots can be deployed in facilities such as warehouses, manufacturing facilities, healthcare facilities, or the like, e.g., to transport items within the relevant facility. Workers in the facility may therefore interact with the robots, e.g., to place items on a robot and/or retrieve items from a robot. The facility may contain a variety of structural features and other objects that may periodically obscure the robots from view to the workers, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
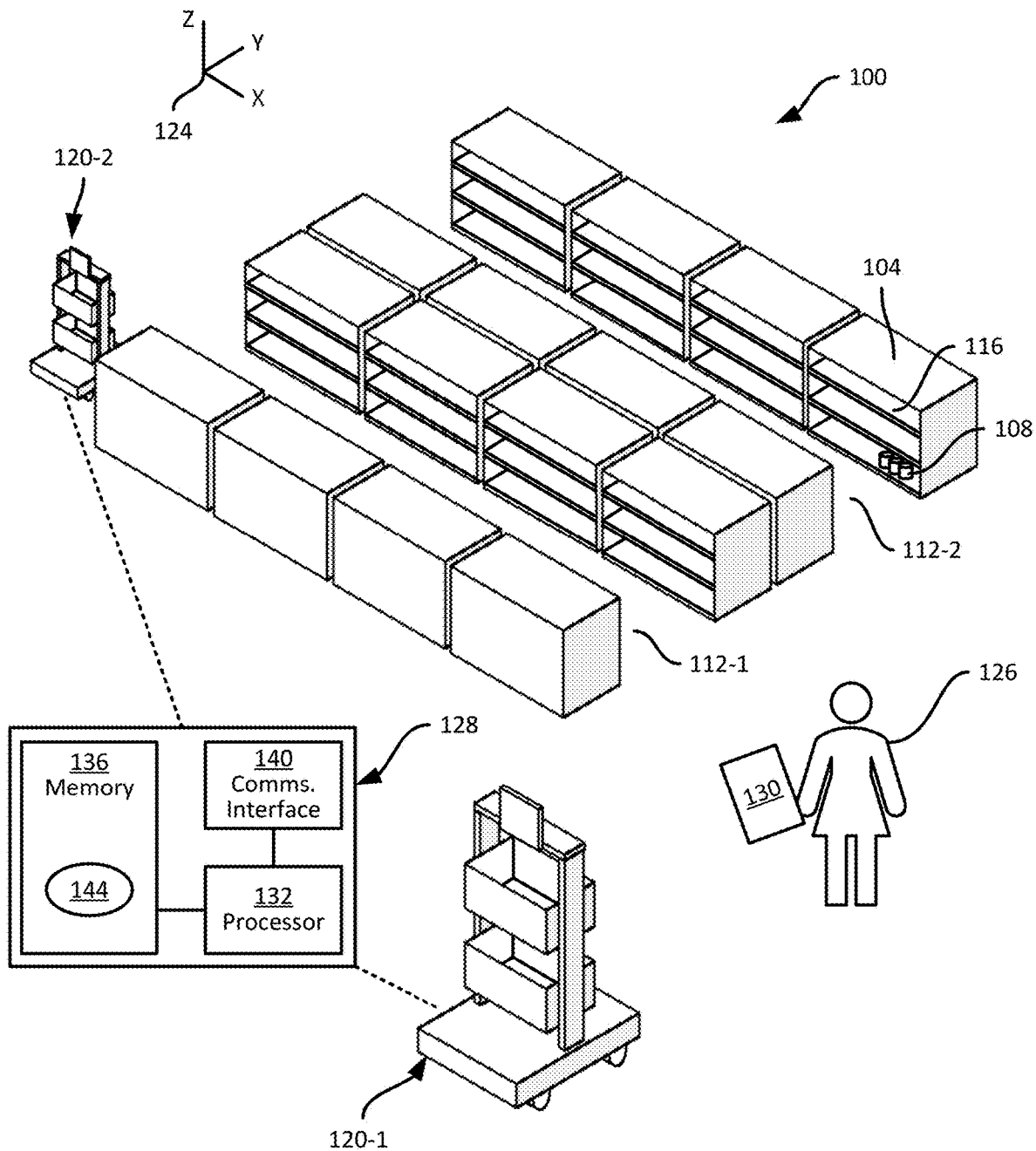
FIG. 1 is a diagram of an item-handing mobile robot deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, including: obtaining a pose of a mobile computing device associated with a worker in a facility; detecting a trigger event to initiate presentation, at the mobile computing device, of visual guidance corresponding to one of a plurality of mobile robots in the facility; in response to detecting the trigger event, selecting one of the mobile robots; determining, based on the pose of the mobile computing device and a map of the facility, whether the selected one of the mobile robots is visually obstructed from the pose of the mobile computing device; and when the selected one of the mobile robots is visually obstructed, providing visual guidance via the mobile computing device, the visual guidance indicating a current location of the selected mobile robot behind an obstruction.

Additional examples disclosed herein are directed to a computing device, comprising: a communications interface; and a processor configured to: obtain a pose of a mobile computing device associated with a worker in a facility; detect a trigger event to initiate presentation, at the mobile computing device, of visual guidance corresponding to one of a plurality of mobile robots in the facility; in response to detecting the trigger event, select one of the mobile robots; determine, based on the pose of the mobile computing device and a map of the facility, whether the selected one of the mobile robots is visually obstructed from the pose of the mobile computing device; and when the selected one of the mobile robots is visually obstructed, provide visual guidance via the mobile computing device, the visual guidance indicating a current location of the selected mobile robot behind an obstruction.

FIG. 1 illustrates an interior of a facility 100, such as a warehouse, a manufacturing facility, a healthcare facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility 100 can include fewer aisles 112 than shown, or more aisles 112 than shown in FIG. 1. The aisles 112, in the illustrated example, are formed by sets of eight support structures 104 (four on each side of each aisle 112). The facility 100 can also have a wide variety of other aisle layouts, however. As will be apparent, each aisle 112 is a space open at the ends, and bounded on either side by support structures 104. The aisles 112 can be travelled by humans, vehicles, and the like. In still further examples, the facility 100 need not include aisles 112, and can instead include assembly lines, or the like.

The items 108 may be handled according to a wide variety of processes, depending on the nature of the facility 100. In some examples, the facility 100 is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by mobile robots 120-1, 120-2 deployed in the facility 100. A greater number of robots 120 can be deployed in the facility 100 than the robots 120-1 and 120-2 shown in FIG. 1, for example based on the size and/or layout of the facility 100. Components of the robot 120 are discussed below in greater detail. In general, each robot 120 in the facility 100 is configured to transport items 108 within the facility 100.

Each robot 120 can be configured to track its pose (e.g., location and orientation) within the facility 100, for example according to a coordinate system 124 previously established in the facility 100. Each robot 120 can navigate autonomously within the facility 100, e.g., travelling to locations assigned to the robot 120 to receive and/or deposit items 108. The items 108 can be deposited into or onto the robot 120, and removed from the robot 120, by human workers, such as a worker 126, and/or mechanized equipment such as robotic arms and the like deployed in the facility 100. The locations to which each robot 120 navigates can be assigned to the robot 120 by a central server 128. That is, the server 128 is configured to assign tasks to the robots 120. Each task can include either or both of one or more locations to travel to, and one or more actions to perform at those locations. For example, the server 128 can assign a task to a given robot 120 to travel to a particular location defined in the coordinate system 124, and to await the receipt of one or more items 108 at that location.

The server 128 can also be configured to assign tasks to the worker 126 (as well as any other workers in the facility 100). Tasks assigned to the worker 126 can include pick lists of items, e.g., with locations of the items such as aisle and/or shelf identifiers. To assign a task to the worker 126, the server 128 can transmit task data to a mobile computing device 130 operated by the worker 126, such as a tablet computer, a smart phone, or the like.

Tasks can be assigned to the robots 120 and the worker 126 via the exchange of messages between the server 128 and the robots 120 and/or the mobile computing device 130, e.g., over a suitable combination of local and wide-area networks. The server 128 can be deployed at the facility 100, or remotely from the facility 100. In some examples, the server 128 is configured to assign tasks to robots 120 at multiple facilities, and need not be physically located in any of the individual facilities.

The worker 126, having received a task assignment from the server 128 (e.g., the task being displayed or otherwise presented to the worker 126 via the device 130), may be required to locate a particular one of the robots 120. For example, the task can include picking an item 108 from a support structure 104 and depositing the item 108 in or on a robot 120. In other examples, the task can include troubleshooting a robot 120 in an error state (e.g., having a low battery, or being obstructed by objects within the facility 100). Locating a particular robot 120 by the worker 126 can be complicated by the support structures 104, walls in the facility 100, other robots 120, and the like. In general, in other words, the relevant robot 120 may be obstructed from view to the worker 126. As discussed below, the server 128 and mobile computing device 130 can therefore be configured to perform certain functions to provide visual guidance to the worker 126 to facilitate locating a robot 120 in the presence of visual obstructions.

Before discussing the functionality implemented by the server 128 and the mobile device 130, certain components of the server 128, the mobile robots, and the mobile computing device 130 are discussed in connection with FIG. 1, FIG. 2, and FIG. 3.

FIG. 1 also illustrates certain components of the server 128. In particular, the server 128 includes a processor 132, such as one or more central processing units (CPU), graphics processing units (GPU), or dedicated hardware controllers such as application-specific integrated circuits (ASICs). The processor 132 is communicatively coupled with a non-transitory computer readable medium such as a memory 136, e.g., a suitable combination of volatile and non-volatile memory elements. The processor 132 is also coupled with a communications interface 140, such as a transceiver (e.g., an Ethernet controller or the like) enabling the server 128 to communicate with other computing devices, such as the mobile robots 120. The memory 136 can store a plurality of computer-readable instructions executable by the processor 132, such as an application 144 whose execution by the processor 132 configures the processor 132 to implement certain functions related to the provision of visual guidance to the worker 126 via the mobile computing device 130.

Figure 2:
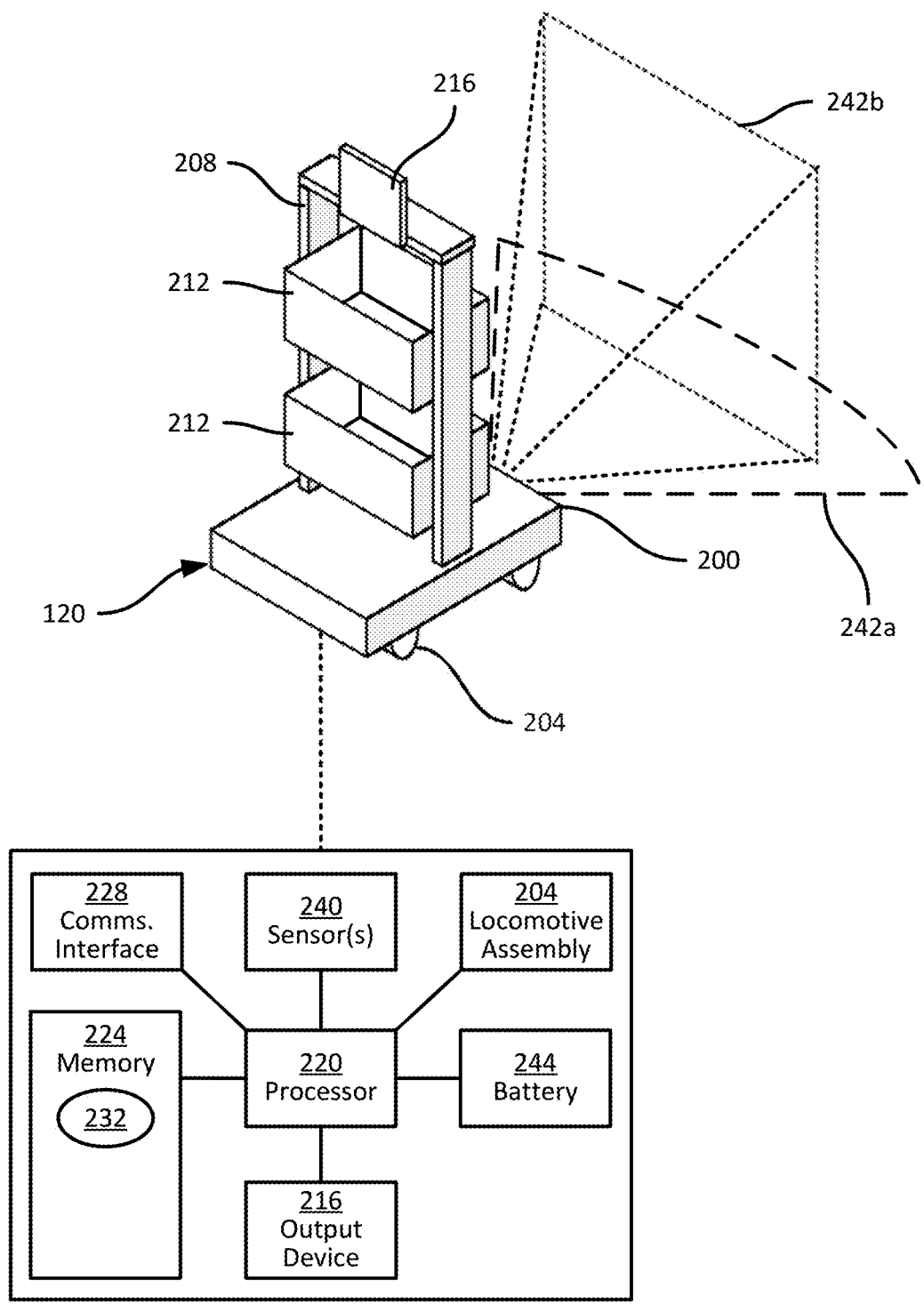
FIG. 2 is a diagram of certain components of a mobile robot of FIG. 1.

As shown in FIG. 2, each robot 120 includes a chassis 200 supporting various other components of the robot 120. In particular, the chassis 200 supports a locomotive assembly 204, such as one or more electric motors driving a set of wheels, tracks, or the like. The locomotive assembly 204 can include one or more sensors such as a wheel odometer, an inertial measurement unit (IMU), and the like.

The chassis 200 also supports receptacles, shelves, or the like, to support items 108 during transport. For example, the robot 120 can include a selectable combination of receptacles 212. In the illustrated example, the chassis 200 supports a rack 208, e.g., including rails or other structural features configured to support receptacles 212 at variable heights above the chassis 200. The receptacles 212 can therefore be installed and removed to and from the rack 208, enabling distinct combinations of receptacles 212 to be supported by the robot 120.

The robot 120 can also include an output device, such as a display 216. In the illustrated example, the display 216 is mounted above the rack 208, but it will be apparent that the display 216 can be disposed elsewhere on the robot 120 in other examples. The display 216 can include an integrated touch screen or other input device, in some examples, The robot 120 can also include other output devices in addition to or instead of the display 216. For example, the robot 120 can include one or more speakers, light emitters such as strips of light-emitting diodes (LEDs) along the rack 208, and the like.

The chassis 200 of the robot 120 also supports various other components, including a processor 220, e.g., one or more central processing units (CPUs), graphics processing units (GPUs), or dedicated hardware controllers such as application specific integrated circuits (ASICs). The processor 220 is communicatively coupled with a non-transitory computer readable medium such as a memory 224, e.g., a suitable combination of volatile and non-volatile memory elements. The processor 220 is also coupled with a communications interface 228, such as a wireless transceiver enabling the robot 120 to communicate with other computing devices, such as the server 128 and other robots 120.

The memory 224 stores various data used for autonomous or semi-autonomous navigation, including an application 232 executable by the processor 220 to implement navigational and other task execution functions. In some examples, the above functions can be implemented via multiple distinct applications stored in the memory 224.

The chassis 200 can also support a sensor 240, such as one or more cameras and/or depth sensors (e.g., lidars, depth cameras, time-of-flight cameras, or the like) coupled with the processor 220. The sensor(s) 240 are configured to capture image and/or depth data depicting at least a portion of the physical environment of the robot 120. Data captured by the sensor(s) 240 can by used by the processor 220 for navigational purposes, e.g., path planning, obstacle avoidance, and the like, as well as for updating a map of the facility in some examples.

The sensors 240 have respective fields of view (FOVs). For example, a first FOV 242a corresponds to a laser scanner, such as a lidar sensor disposed on a forward-facing surface of the chassis 200. The FOV 242a can be substantially two-dimensional, e.g., extending forwards in a substantially horizontal plane. A second FOV 242b corresponds to a camera (e.g., a depth camera, a color camera, or the like) also mounted on the forward-facing surface of the chassis 200. As will be apparent, a wide variety of other optical sensors can be disposed on the chassis 200 and/or the rack 208, with respective FOVs 242.

The components of the robot 120 that consume electrical power can be supplied with such power from a battery 244, e.g., implemented as one or more rechargeable batteries housed in the chassis 200 and rechargeable via a charging port (not shown) or other suitable charging interface.

Figure 3:
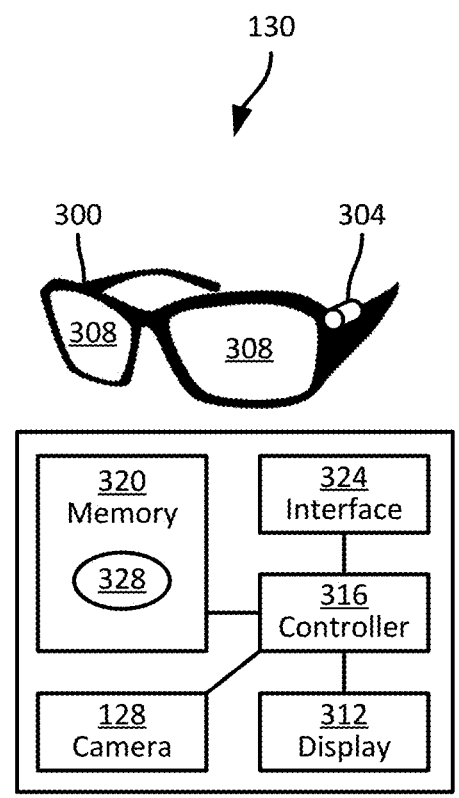
FIG. 3 is a diagram of certain components of a mobile computing device in the system of FIG. 1.

Turning to FIG. 3, certain components of the mobile computing device 130 are illustrated. In the illustrated example, the device 130 is implemented as a wearable computing device, e.g., including a head-mounted display unit (also referred to as a heads-up display, or HUD) with a frame 300 carrying a camera 304 and lenses 308, at least one of which can include an integrated display 312. The camera 304 is oriented to direct a field of view (FOV) thereof in a direction corresponding to the FOV of the worker 126 themselves. As will be apparent, the display 312 can be controlled to overlay information with the FOV of the worker 126. The device 130 can include additional input and output assemblies, such as a microphone, a speaker, and the like (not shown).

The device 130 also includes a controller 316, such as a CPU, GPU or the like, connected with the camera 304 and display 312. The controller 316 is further connected with a non-transitory computer readable medium such as a memory 320. The device 130 also includes a communications interface 324 enabling communication between the device 130 and other computing devices such as the server 128, via suitable short-range links, networks, and the like. In some examples, the controller 316, memory 320, and interface 324 can be supported on the frame 300. In other examples, the controller 316, memory 320, and interface 324 can be supported by a housing separate from the frame 300 and carried by the worker 126. The device 130 can also include other sensors in some examples, such as a radio frequency identifier (RFID) reader, a motion sensor such as an inertial measurement unit (IMU), and the like.

The memory 320 stores a plurality of applications executable by the controller 316 to implement various functionality, including an application 328 whose execution by the controller 316 configures the controller 316 to perform various actions related to the tracking of a pose of the device 130 in the coordinate system 124, and the provision of visual guidance to the worker 126 for locating visually obstructed robots 120 and/or the provision of contextual information corresponding to a robot 120, such as an error state. The functionality implemented via execution of the application 328 can also be implemented via a distinct, special-purpose controller such as a field-programmable gate array (FPGA), application-specific integrated circuit (ASIC), or the like, in other examples.

Figure 4:
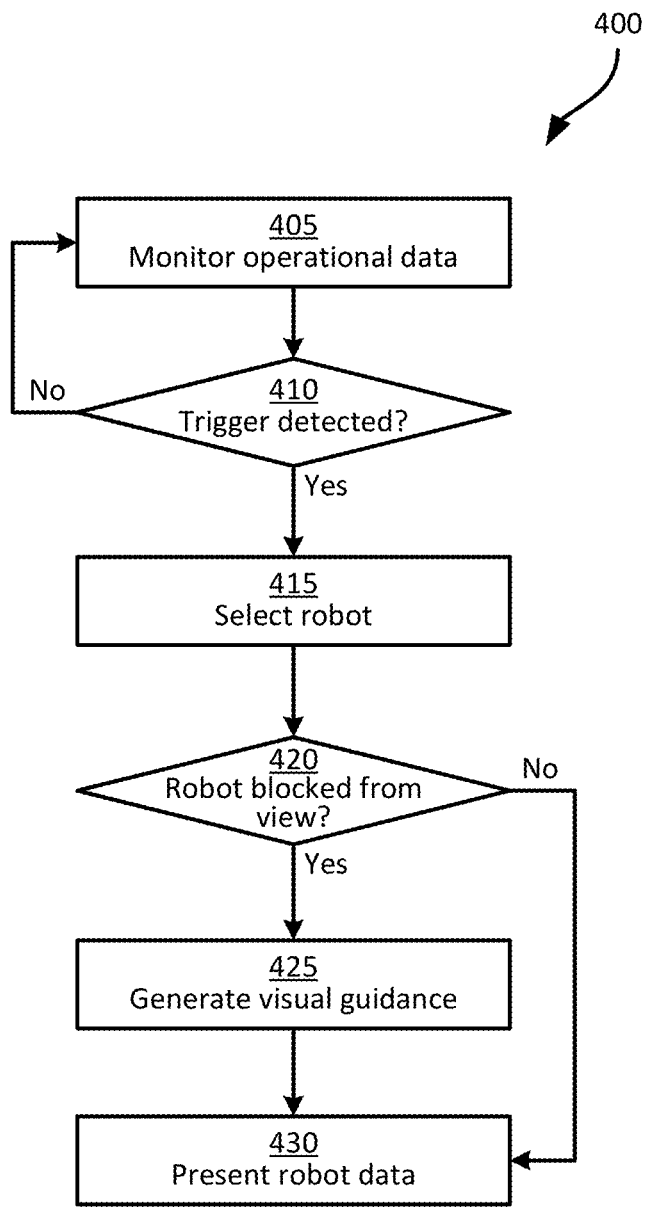
FIG. 4 is a flowchart illustrating a method of providing visual guidance for locating obstructed mobile robots.

Turning to FIG. 4, a method 400 of providing visual guidance for locating and interacting with robots 120 by the worker 126 is illustrated. The method 400 is described below in conjunction with its example performance in the facility 100. For example, the method 400 can be performed by the server 128 in some examples. In other examples, however, at least some of the blocks of the method 400 can be performed by the mobile device 130.

At block 405, the server 128 is configured to collect and monitor operational data from either or both of the robots 120 and the mobile computing device 130. For example, each of the robots 120 can be configured to periodically report its tracked pose within the facility 100 to the server 128, e.g., along with an identifier of the robot such as a media access control (MAC) address or other suitable identifier distinguishable from identifiers of other robots 120. Each robot 120 can also be configured to report a wide variety of other data to the server 128, including navigational path data, error states detected by the robot 120 (e.g., low battery errors, mislocalization errors, and the like).

The mobile device 130 can also be configured to transmit various data to the server 128, for receipt at block 405. For example, the device 130 can be configured to track its pose within the facility 100, e.g., in the coordinate system 124. The controller 316 can, for example, be configured to detect features in images captured via the camera 304 (e.g., edges, surfaces, and the like), and to track the position of such features in successive images captured via the camera 304. The changes in position of such features between successive image frames, in combination with data from a motion sensor such as an IMU of the device 130, are used by the controller 316 to track the pose of the device 130 (or more specifically, of the frame 300 and camera 304). In other examples, e.g., where the device 130 does not include a HUD assembly as shown in FIG. 3, the location of the device 130 may be tracked via combinations of IMU data and signal strength measurements from wireless beacons disposed in the facility 100.

The device 130 can also transmit various other data to the server 128, including workflow-related data such as item identifiers of items 108 retrieved from the support structures 104 by the worker 126 (e.g., and scanned using the camera 304). Such other data can also include, in some examples, requests generated via selection (by the worker 126) of user interface elements presented on the display 312. Such requests can include requests for guidance to the nearest robot 120, and/or to the nearest robot 120 of a particular type specified in the request, and/or for contextual information such as an error state indicator for a given robot 120.

Figure 5:
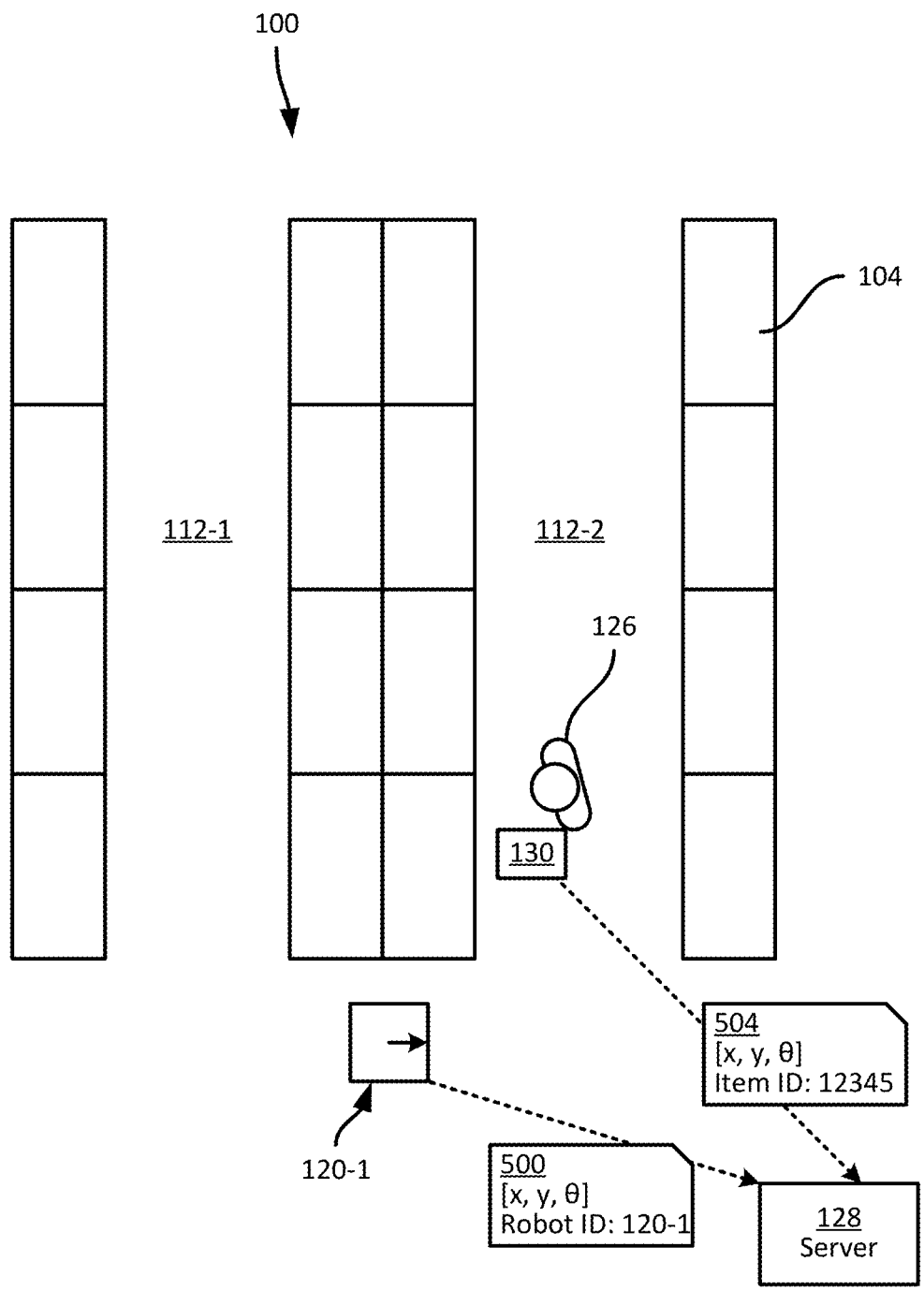
FIG. 5 is a diagram illustrating an example performance of block 405 of the method of FIG. 4.

Referring to FIG. 5, an overhead view of the facility 100 is shown, with the worker 126 in the aisle 112-2 and the robot 120-1 outside the aisles 112, in between the aisles 112-1 and 112-2. The server 128 is shown receiving, at block 405, a pose report 500 from the robot 120-1 indicating the current pose of the robot 120-1 (e.g., in x and y coordinates as well as a heading angle theta). The server 128 is also shown receiving a message 504 from the device 130, containing a current pose of the device 130. The current pose of the device 130 is equivalent to the current pose of the worker 126 when, as in this example, the device 130 includes a HUD assembly as shown in FIG. 3. The message 504 also includes an item identifier "12345", e.g., indicating that the worker 126 has used the device 130 to scan an item 108 picked from a support structure 104. The scanned item can be, for example, on a pick list of items 108 previously assigned to the worker 126 for retrieval from the support structures and placement onto one or more robots 120. Those robots 120, in turn, may deliver the items 108 to packaging and/or shipping areas of the facility 100.

The message 504, in other words, indicates that the worker 126 has picked an item 108, and may require guidance as to which robot 120 in which to place the item 108. Returning to FIG. 4, at block 410, the server 128 is configured to determine whether a trigger event has been detected, e.g., from the operational data collected at block 405. The server 128 can maintain a plurality of trigger definitions and evaluate those definitions at block 410. Each trigger definition includes one or more criteria, and when the criteria for a given definition are met by the operational data collected at block 405, the determination at block 410 is affirmative.

The trigger definitions can include, for example, whether an item scan has been reported by the device 130 (e.g., in the form of a message such as the message 504). Another example trigger definitions include whether a search request for a robot 120 has been received from the device 130 (e.g., the nearest robot to the device 130, or the nearest robot 120 of a particular type, when more than one type of robot 120 are deployed in the facility 100). A further example trigger definition includes whether the current pose (e.g., the most recently received pose at block 405) of the device 130 is within a proximity threshold of the current pose of a robot 120 having reported an error state. A further example trigger definition includes whether the current pose of the device 130 is within a proximity threshold of the current pose of a robot 120 with a task assignment to travel to a location in the facility 100 that is identified in a current pick list of the worker 126 (e.g., a location to which at least some items on the pick list are to be delivered).

In the present example, the determination at block 410 is affirmative, because the message 504 received from the device 130 includes an item identifier (and therefore indicates that the worker 126 has retrieved an item 108 from a support structure 104). The server 128 therefore proceeds to block 415. When the determination at block 410 is negative, the server 128 can continue monitoring operational data at block 405.

At block 415, in response to detecting a trigger event, the server 128 is configured to select a robot 120, based on the trigger event detected at block 410. The server 128 can store, for example in association with the trigger definitions, robot selection definitions for use at block 415. For instance, in the event of an item scan detected at block 410, the server 128 can be configured to select a robot 120 based on stored (e.g., in the memory 136) task assignments for the robots 120. In some implementations, pick lists are assigned to workers 126, and aisles 112 and/or individual workers 126 are assigned to robots 120. Thus, at block 415, the server 128 can determine which robot 120 is assigned to the worker 126, to the aisle 112-2, or the like. In other examples, the selection at block 415 can be proximity-based. For example, the server 128 can select the nearest robot 120 to the current pose of the device 130.

The robot 120 selected at block 415 is, in the present example, the robot 120 to which the worker 126 is expected to place the item 108 identified in the message 504. More generally, the robot 120 selected at block 415 is associated (e.g., temporarily) with the worker 126, for the purpose of providing status data or the like about the selected robot 120 to the worker 126.

Having selected the robot 120-1 at block 415, at block 420 the server 128 is configured to determine whether the selected robot 120 is visually obstructed from the pose of the device 130. As seen from FIG. 5, although the robot 120-1 is located relatively close to the worker 126, the worker 126 may not be able to see the robot 120-1, as the robot 120-1 is outside the aisle 112-2 in which the worker 126 is located. The robots 120 can include lights or other indicators (e.g., the display 216) to signal their presence, availability, or other state information. However, support structures 104, walls, or other objects within the facility 100 may obscure such visual indicators from view, from the perspective of the worker 126, and complicate the discovery of the correct robot 120 to interact with.

The determination at block 420 can include identifying which portions of a map of the facility 100, and/or which specific objects, are within a field of view of the worker 126, as determined from the pose in the message 504. For example, turning to FIG. 6, the server 128 can determine a position of the FOV 600 of the worker 126, e.g., based on the pose from the message 504 and a predetermined view angle stored in the memory 136. The server 128 can then be configured to determine that portions of the support structures 104-1 and 104-2 fall within the FOV 600, but that the robot 120-1, in its current pose, does not fall within the FOV 600. The determination at block 420 is therefore affirmative.

Figure 6:
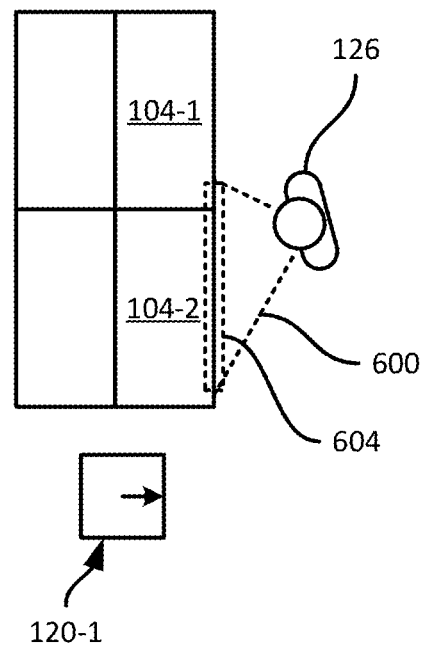
FIG. 6 is a diagram illustrating an example performance of block 420 of the method of FIG. 4.
Figure 6:
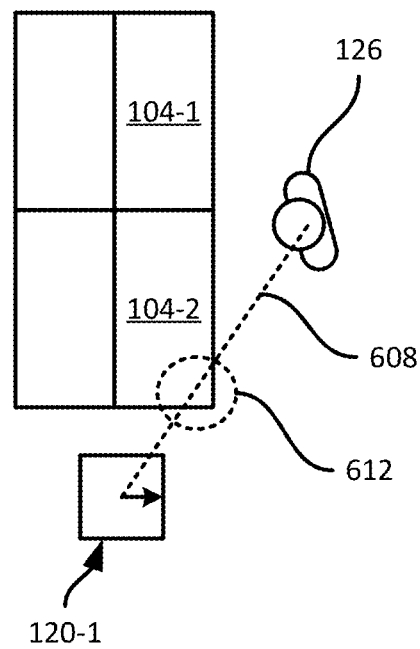

In other examples, e.g., shown in the lower portion of FIG. 6, the server 128 can omit generation of a simulated FOV 600 for the worker 126, and instead determine whether any objects in a map of the facility 100 are intersected by a line 608 extending between the location of the worker 126 and the location of the robot 120-1 (regardless of the angle of orientation of the worker 126). As shown in FIG. 6, the line 608 intersects a portion 612 of the support structure 104-2, and the determination at block 420 is therefore affirmative.

Returning to FIG. 4, when the determination at block 420 is affirmative, the server 128 proceeds to block 425. At block 425, the server 128 is configured to generate data defining visual guidance for rendering at the mobile device 130. The visual guidance, as discussed below, serves to indicate the location of a robot 120 to the worker 126 when that robot 120 is visually obstructed and may therefore not be readily visible to the worker 126. The data generated at block 425 can include, for example, a graphical overlay, including an augmented reality display showing robot's status and location behind an obstruction, and/or an image representing a portion of the facility 100, for presentation on the display 312. In other examples, the visual guidance can include a location (e.g., as coordinates in the coordinate system 124) of the robot 120, and the device 130 itself can generate the resulting visual guidance for rendering on the display 312.

At block 430, having generated visual guidance at block 425, or following a negative determination at block 420, the server 128 is configured to transmit data associated with the robot selected at block 415 to the device 130, for presentation at the device 130. The data transmitted for presentation at block 430 includes, when block 425 was performed, the visual guidance data mentioned above. The data transmitted at block 430 can also include further status data for the robot selected at block 415.

Figure 7:
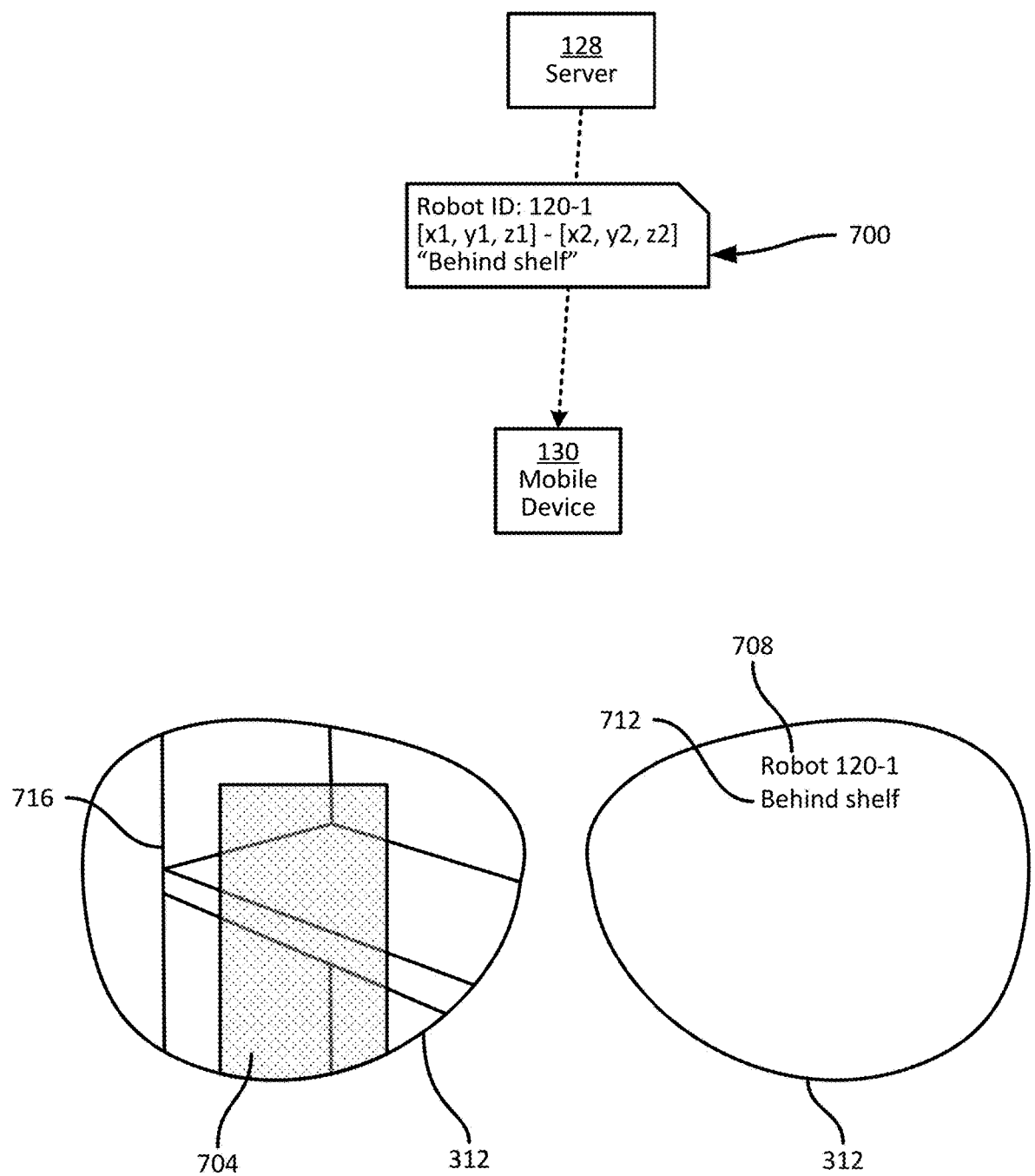
FIG. 7 is a diagram illustrating an example performance of blocks 425 and 430 of the method of FIG. 4.

Turning to FIG. 7, an example message 700 sent from the server 128 to the device 130 at block 430 is illustrated. For example, the message 700 can include a robot identifier (e.g., "120-1"), and coordinates defining a bounding box for a graphical overlay. The coordinates can include, for example, a first set (x1, y1, and z1) for an upper-left corner of the overlay, and a second (x2, y2, z2) for a lower-right corner of the overlay. A wide variety of other data can also be employed to define the overlay.

As shown in FIG. 7, in response to receiving the message 700, the device 130 can render, on the display(s) 312, visual guidance including an overlay 704 indicating the position of the robot 120-1 relative to the worker 126, as well as an indication 708 of the robot identifier, and a textual indication 712 of the position of the robot 120-1, also defined in the message 700. The overlay 704 can be rendered over a current video feed from the camera 304 showing a field of view of the worker 126, or projected onto transparent lenses through which a portion 716 of a support structure is visible.

Figure 8:
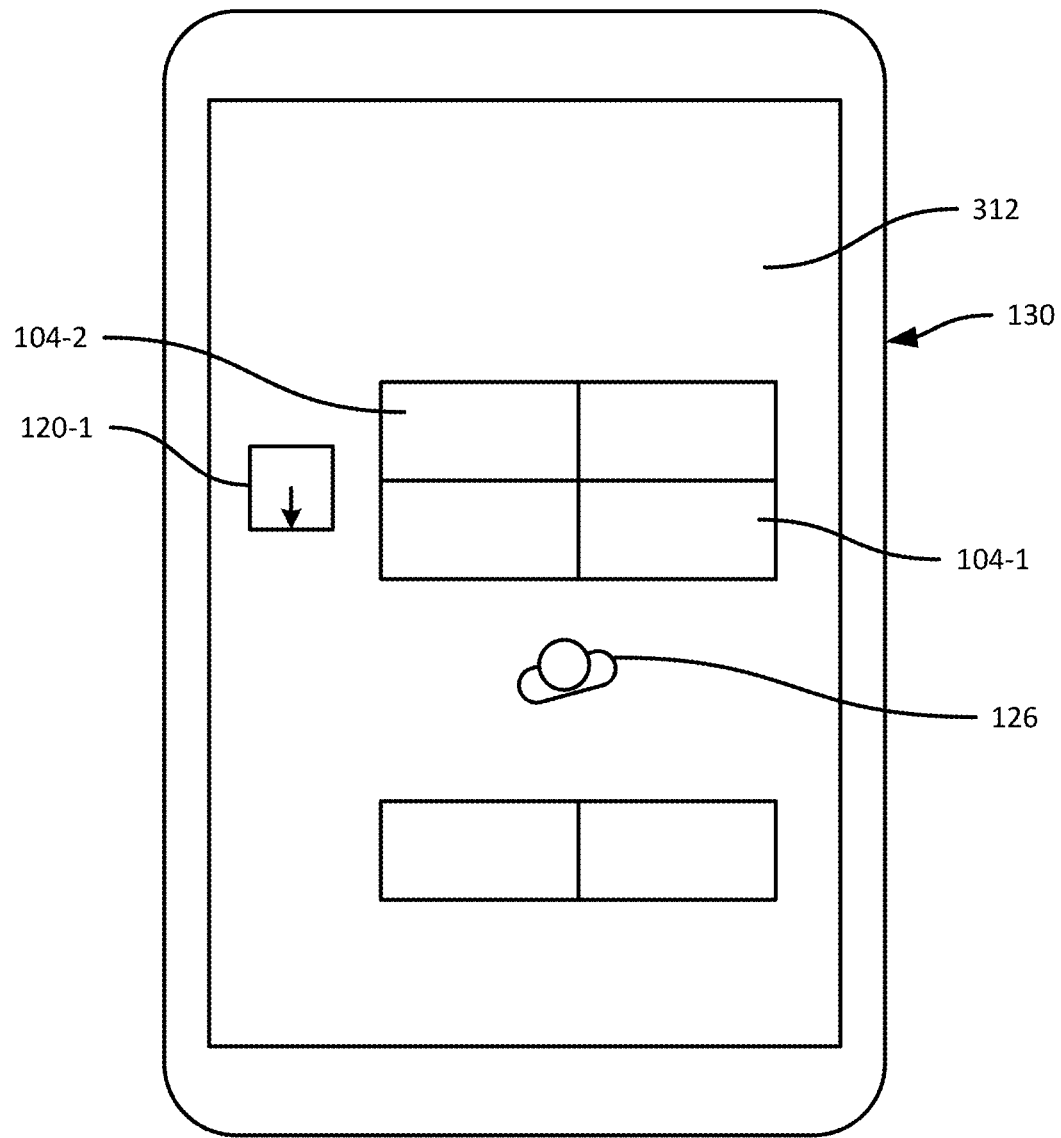
FIG. 8 is a diagram illustrating another example performance of blocks 425 and 430 of the method of FIG. 4.

As noted earlier, the visual guidance provided by the server 128 can be provided in other forms than the overlay shown in FIG. 7. For example, as illustrated in FIG. 8, the visual guidance can include a portion of a map of the facility 100, which can be rendered on the display 312 of the device 130. The map portion can indicate, for example, a current location of the robot 120-1 relative to a current position of the worker 126 (both derived from the operational data collected at block 405).

Figure 9:
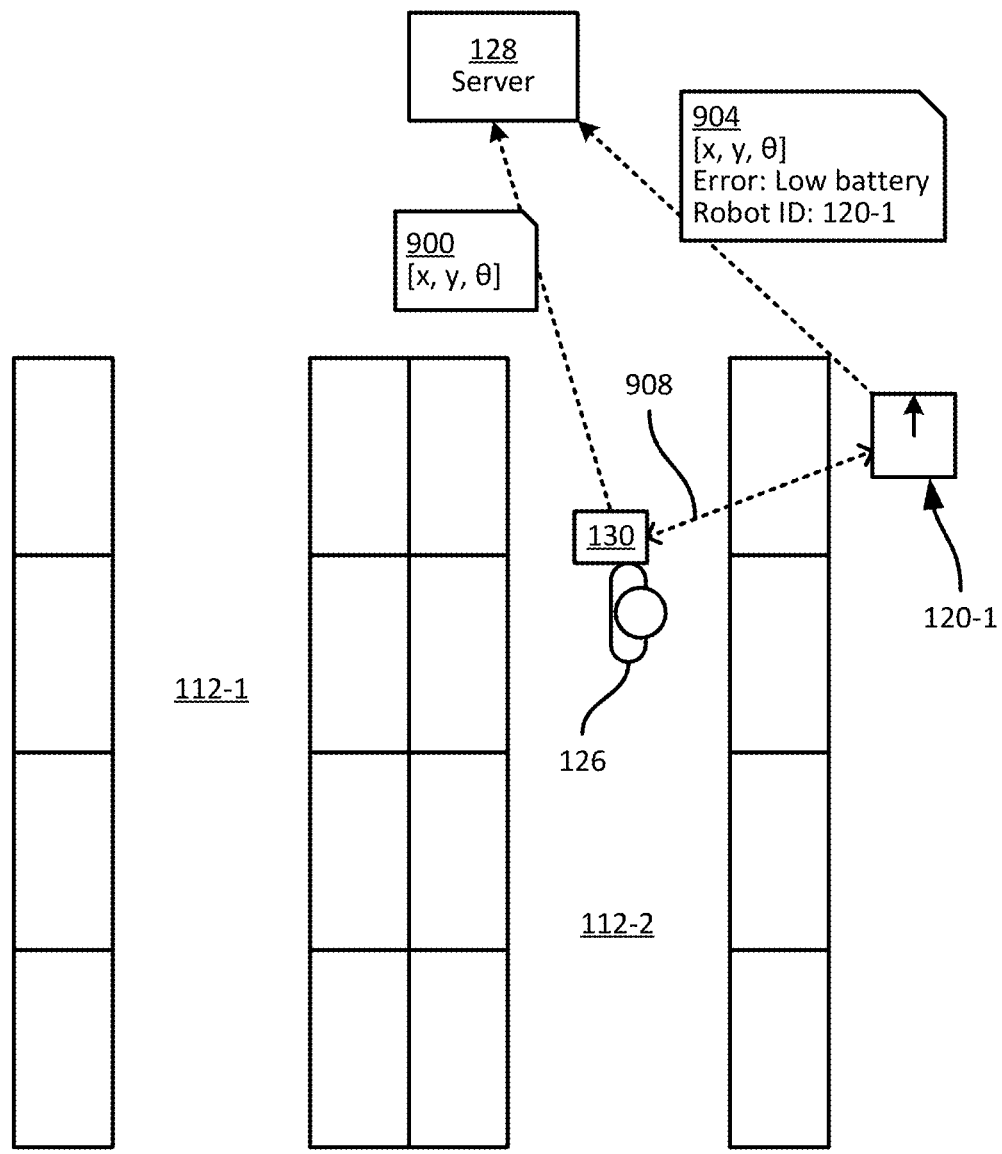
FIG. 9 is a diagram illustrating an example performance of blocks 405 and 410 of the method of FIG. 4.

The method 400 can be performed by the server 128 and/or device 130 to deploy a wide variety of information to the worker 126. For example, turning to FIG. 9, another performance of block 405 is illustrated in which a current pose of the device 130 is reported to the server 128 in a message 900. Further, the robot 120-1 is shown transmitting a message 904 containing a current pose of the robot 120-1, as well as an identifier of the robot 120-1 and an error state.

Figure 10:
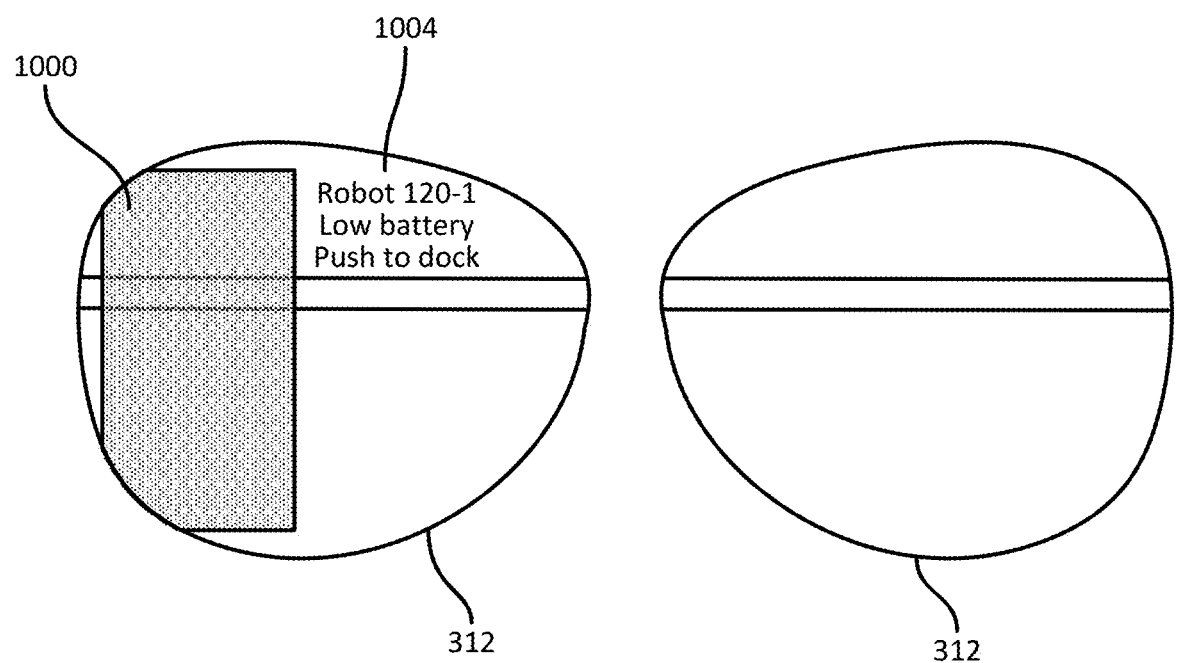
FIG. 10 is a diagram illustrating a further example performance of blocks 425 and 430 of the method of FIG. 4.

The server 128 may detect a trigger event at block 410, for example based on a distance 908 between the device 130 and the robot 120-1 being smaller than a proximity threshold. In response, the server 128 can select the robot 120-1 at block 415, and determine whether the robot 120-1 is visually obstructed from the worker 126 as discussed above in connection with FIG. 6. The determination at block 420 is affirmative, and the server 128 can therefore generate and send visual guidance data to the device 130 as noted above. In addition, e.g., at block 430, the server 128 can transmit additional data 1004, such as the error state of the robot 120-1 and/or instructions for the worker 126 to remediate the error state. As shown in FIG. 10, for instance, an overlay 1000 may be rendered on the display(s) 312 indicating the location of the robot 120-1 relative to the worker 126. The visual guidance presented on the display(s) 312 can also include the robot identifier, the error state (e.g., "Low battery"), and the above-mentioned instructions (e.g., "Push to dock").

As will be apparent, the method 400 can also serve to provide guidance to the worker 126 via the device 130 to resolve robot error states following a negative determination at block 420. In such examples, the overlay 1000 can be omitted, and the error state and instructions can be provided, for rendering on the display 312. Given that in such examples, the robot 120-1 may be visible to the worker 126 rather than visually obstructed, the trigger definitions at block 410 can also include a trigger event in the form of a request from the device 130 for error state information. The server 128 can identify the relevant robot 120 from a robot identifier in the request itself, or based on proximity between the device 130 and the robots 120 (e.g., by searching for the nearest robot 120 to the device 130 having an active error state).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining a pose of a mobile computing device associated with a worker in a facility;
   detecting a trigger event to initiate presentation, at the mobile computing device, of visual guidance corresponding to one of a plurality of mobile robots in the facility;
   in response to detecting the trigger event, selecting one of the mobile robots;
   determining, based on the pose of the mobile computing device and a map of the facility, whether the selected one of the mobile robots is visually obstructed from the pose of the mobile computing device; and
   when the selected one of the mobile robots is visually obstructed, providing visual guidance via the mobile computing device, the visual guidance indicating a current location of the selected mobile robot behind an obstruction.

2. The method of claim 1, wherein detecting the trigger event includes: receiving an item scan from a sensor of the mobile computing device.

3. The method of claim 2, wherein selecting the mobile robot includes: selecting one of the mobile robots associated with the item scan.

4. The method of claim 1, wherein selecting the mobile robot includes:
   retrieving locations of each of the mobile robots; and
   selecting the mobile robot having a location nearest to the pose of the mobile computing device.

5. The method of claim 1, wherein determining whether the selected one of the mobile robots is visually obstructed includes:
   determining whether the map defines an obstacle between the pose of the mobile computing device and the current location of the selected mobile robot.

6. The method of claim 5, wherein determining whether the selected one of the mobile robots is visually obstructed further includes:
   determining whether the current location of the selected mobile robot is within a field of view of the mobile computing device.

7. The method of claim 6, wherein the mobile computing device includes a heads-up display.

8. The method of claim 1, wherein detecting the trigger event includes:
   determining that one of the mobile robots is in an error state;
   wherein the selecting includes selecting the one of the mobile robots in the error state.

9. The method of claim 8, wherein detecting the trigger event further includes:
   determining that the pose of the mobile computing device is within a threshold distance of the current location of the mobile robot in the error state.

10. The method of claim 8, wherein the visual guidance further includes the error state.

11. A computing device, comprising:
    a communications interface; and
    a processor configured to:
       obtain a pose of a mobile computing device associated with a worker in a facility;
       detect a trigger event to initiate presentation, at the mobile computing device, of visual guidance corresponding to one of a plurality of mobile robots in the facility;
       in response to detecting the trigger event, select one of the mobile robots;
       determine, based on the pose of the mobile computing device and a map of the facility, whether the selected one of the mobile robots is visually obstructed from the pose of the mobile computing device; and
       when the selected one of the mobile robots is visually obstructed, provide visual guidance via the mobile computing device, the visual guidance indicating a current location of the selected mobile robot behind an obstruction.

12. The computing device of claim 11, wherein the processor is configured to detect the trigger event by receiving an item scan from a sensor of the mobile computing device.

13. The computing device of claim 12, wherein the processor is configured to select the mobile robot by selecting one of the mobile robots associated with the item scan.

14. The computing device of claim 11, wherein the processor is configured to select the mobile robot by:
    retrieving locations of each of the mobile robots; and
    selecting the mobile robot having a location nearest to the pose of the mobile computing device.

15. The computing device of claim 11, wherein the processor is configured to determine whether the selected one of the mobile robots is visually obstructed by:
    determining whether the map defines an obstacle between the pose of the mobile computing device and the current location of the selected mobile robot.

16. The computing device of claim 15, wherein the processor is configured to determine whether the selected one of the mobile robots is visually obstructed further by:
    determining whether the current location of the selected mobile robot is within a field of view of the mobile computing device.

17. The computing device of claim 16, wherein the mobile computing device includes a heads-up display.

18. The computing device of claim 11, wherein the processor is configured to detecting the trigger event by:
    determining that one of the mobile robots is in an error state;
    wherein the selecting includes selecting the one of the mobile robots in the error state.

19. The computing device of claim 18, wherein the processor is configured to detect the trigger event further by:
    determining that the pose of the mobile computing device is within a threshold distance of the current location of the mobile robot in the error state.

20. The computing device of claim 18, wherein the visual guidance further includes the error state.

\* \* \* \* \*